United States Patent
Suzuki

(10) Patent No.: US 6,595,702 B2
(45) Date of Patent: Jul. 22, 2003

(54) CAMERA

(75) Inventor: Tatsuya Suzuki, Tokyo (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 10/055,766

(22) Filed: Jan. 23, 2002

(65) Prior Publication Data

US 2002/0097999 A1 Jul. 25, 2002

(30) Foreign Application Priority Data

Jan. 25, 2001 (JP) ........................................ 2001-017175

(51) Int. Cl.⁷ .............................................. G03B 17/04
(52) U.S. Cl. ........................................ 396/349; 396/448
(58) Field of Search .................................. 396/349, 448

(56) References Cited

U.S. PATENT DOCUMENTS

| | | | | |
|---|---|---|---|---|
| 4,019,192 A | * | 4/1977 | Miyagawa | 396/349 |
| 4,367,028 A | * | 1/1983 | Tomatsuri et al. | 396/448 |
| 5,737,658 A | * | 4/1998 | Arai | 396/448 |
| 5,797,047 A | * | 8/1998 | Ando et al. | 396/349 |
| 5,805,947 A | * | 9/1998 | Miyamoto et al. | 396/448 |
| 5,819,127 A | * | 10/1998 | Yokota | 396/349 |
| 5,892,996 A | * | 4/1999 | Yokota | 396/349 |
| 5,950,028 A | * | 9/1999 | Ito | 396/349 |
| 6,305,852 B1 | * | 10/2001 | Suzuki et al. | 396/349 |
| 6,350,067 B1 | * | 2/2002 | Soumi et al. | 396/448 |

FOREIGN PATENT DOCUMENTS

| | | |
|---|---|---|
| JP | 5-216092 | 8/1993 |
| JP | 7-13243 | 1/1995 |
| JP | 8-234271 | 9/1996 |
| JP | 10-56588 | 2/1998 |
| JP | 10-153811 | 6/1998 |
| JP | 11-7059 | 1/1999 |
| JP | 2000-98446 | 4/2000 |
| JP | 2000-221562 | 8/2000 |
| JP | 2001-005049 | 1/2001 |

* cited by examiner

Primary Examiner—Alan A. Mathews
(74) Attorney, Agent, or Firm—Volpe and Koenig, P.C.

(57) ABSTRACT

A camera comprises a lens tube having a plurality of tube frames of different inner diameters, the plurality of tube frames moving between a collapsed position and a photographing position, and a lens barrier movable between a covered position and an exposed position, in which in a state of the lens tube being housed in the collapsed position, a shape of an outer peripheral surface of a tip portion of a first tube frame positioned closest to an optical axis becomes larger in the diameter as it is closer to a photographer side along the optical axis, and a position of a tip portion of a second tube frame having a larger diameter than an outer diameter of the first tube frame is positioned at the photographer side rather than the maximum diameter portion of the outer peripheral surface of the tip portion of the first tube frame.

17 Claims, 4 Drawing Sheets

CAMERA

CROSS-REFERENCE TO RELATED APPLICATIONS

This application is based upon and claims the benefit of priority from the prior Japanese Patent Application No. 2001-017175, filed Jan. 25, 2001, the entire contents of which are incorporated herein by reference.

BACKGROUND OF THE INVENTION

1. Field of the Invention

The present invention relates to a camera comprising a collapsible mount type photographic lens tube with a lens barrier.

2. Description of the Background Art

The camera comprising a collapsible mount type photographic lens tube with a lens barrier comprises a lens protection mechanism by the lens barrier and a collapsible function by the collapsible mount type photographic lens tube. For this reason, when the camera is not used, a photographic lens is safely protected. The camera has a thin camera body. As a result, the above described camera is extremely easy to carry and good in portability.

FIG. 1 is a sectional view of a main part showing an example of a camera comprising a conventional collapsible mount type photographic lens tube with a lens barrier. In FIG. 1, reference numeral 50 denotes a camera main body, reference numeral 60 denotes a collapsible mount type photographic lens tube, and reference numeral 70 denotes a lens barrier.

The collapsible mount type photographic lens tube 60 can be operated so as to advance and retreat a moving tube frame 62 holding a photographic lens 61 along a photographic optical axis O. That is, when the camera is not used, the photographic lens 61 retreat into a collapsed position P1 inside the camera main body 50 and is put into a housed state. On the other hand, when the camera is used, the photographic lens 61 advances to a position shown by a two-dot chain line, that is, up to a photographing position P2 outside of the camera main body 50 and is put into a state of being able to take a photograph.

The lens barrier 70 is usually attached to the front surface of the camera main body 50 in such a manner as to be movable in a direction (a vertical direction to the paper surface) orthogonal to the photographic optical axis O. That is, when the camera is not used, the lens barrier 70 moves to a closed position covering the front surface of the above described photographic lens 61, so that it is put into a state of protecting the photographic lens 61. On the other hand, when the camera is used, the lens barrier 70 moves to an open position that is shifted from the front surface of the photographic lens 61, so that the front surface of the photographic lens 61 is opened, thereby making it possible to take a photograph.

In the camera comprising the conventional collapsible mount type photographic lens tube 60 with the lens barrier 70, an outer surface shape of a front side end portion of the collapsible mount type photographic lens tube 60 at the time when the photographic lens 61 retreats to the collapsed position P1 is provided in such a manner as to be an almost flat surface which is vertical to the photographic optical axis O at its front surface as shown in FIG. 1. On the other hand, an inner surface shape of the lens barrier 70 has usually a concave curved surface, as shown in FIG. 1, so as not to touch an outer periphery of the moving tube frame 62 of the above described collapsible mount type photographic lens tube 60 and also to secure a mechanical strength capable of enduring an external force. For this reason, the inner surface of the lens barrier 70 on the photographic optical axis O and the outer surface of the photographic lens 61 are opposed to each other at a relatively large distance G. For this reason, a thickness of the camera body inclusive of the lens barrier is relatively large, thereby preventing the camera from becoming thinner.

BRIEF SUMMARY OF THE INVENTION

An object of the present invention is to provide a thinner camera.

That is, the camera according to the present invention is a camera in which a lens barrier can be arranged so as to be brought as closely as possible near to a position of an approachable limit to a front side end portion of a photographic lens tube along a photographic optical axis and, by a portion equivalent to a distance that could be approached, a total thickness dimension of a camera main body and the lens barrier can be made smaller. In this way, the camera can be thinned.

A camera according to an aspect of the present invention comprises: a camera main body; a photographic lens tube having a photographic lens which is mounted on a front side of the above described camera main body and provided so as to be able to advance and retreat between a collapsed position retreated to the backside of the camera main body and a photographing position advanced to the front side of the above described camera main body; a lens barrier mounted on the front surface of the camera main body and provided so as to be movable in a direction to substantially vertically cross the photographic optical axis (for example, in the direction along a horizontal axis H comprising a liner line or the direction along the horizontal axis comprising a curved line curved inside a horizontal surface) between a closed position for closing the front surface of the photographic lens so as to cover the photographic lens retreated to the collapsed position when it is not used and an open position for opening the front surface of the photographic lens so as not to prevent the movement of the photographic lens advancing to the photographing position when it is used, wherein the outer surface shape of the front side end portion of the photographic lens tube at the time when the photographic lens retreats to the collapsed position is formed in a shape (including a convex cylindrical surface or a spherical surface and the like) corresponding to the inner surface shape (including a concave cylindrical surface or a spherical surface and the like) of the lens located at the closed position.

BRIEF DESCRIPTION OF THE SEVERAL VIEWS OF THE DRAWING

FIG. 2A is a perspective external view, and FIG. 2B is a longitudinal sectional view of a main part;

FIG. 3A is a schematic sectional view seen from the upper side of the camera, and FIG. 3B is a schematic longitudinal sectional view seen from the side of the camera.

DETAILED DESCRIPTION OF THE INVENTION (First Embodiment)

Figure 1:
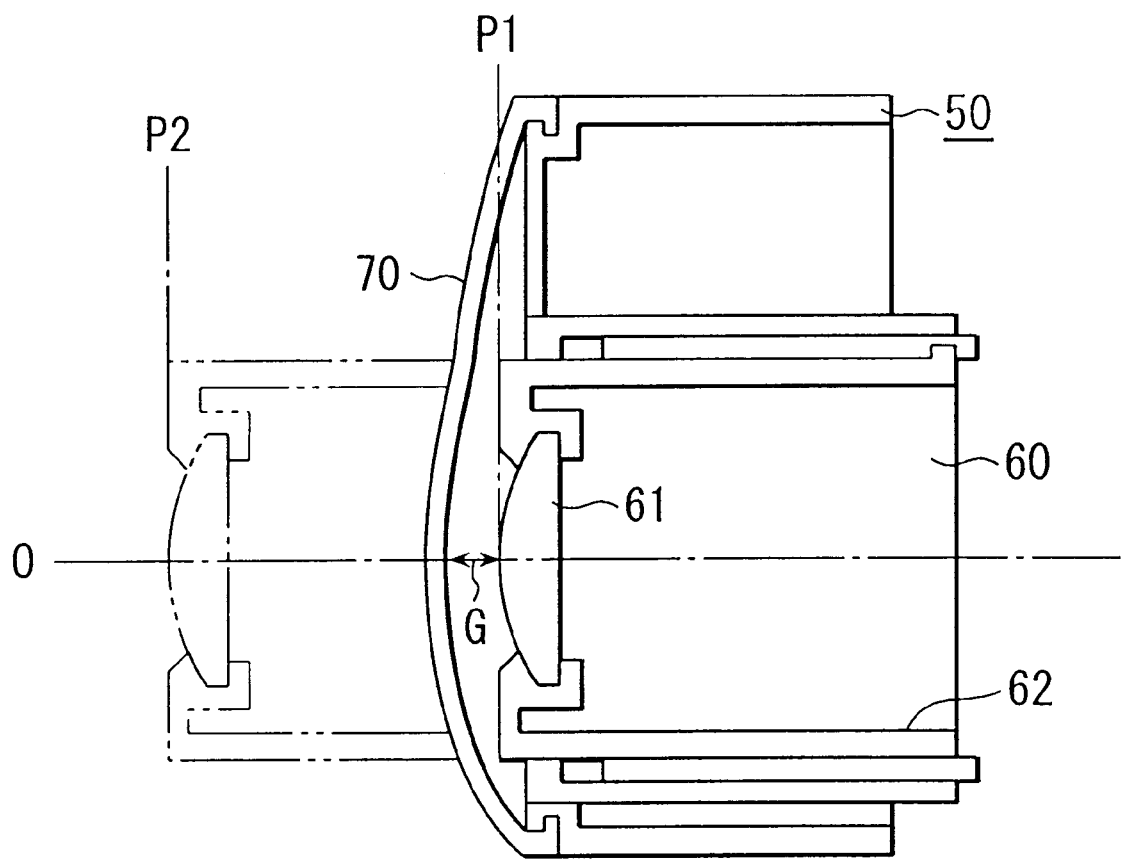
FIG. 1 is a sectional view of a main part of a camera according to a conventional ones.
Figure 2A:
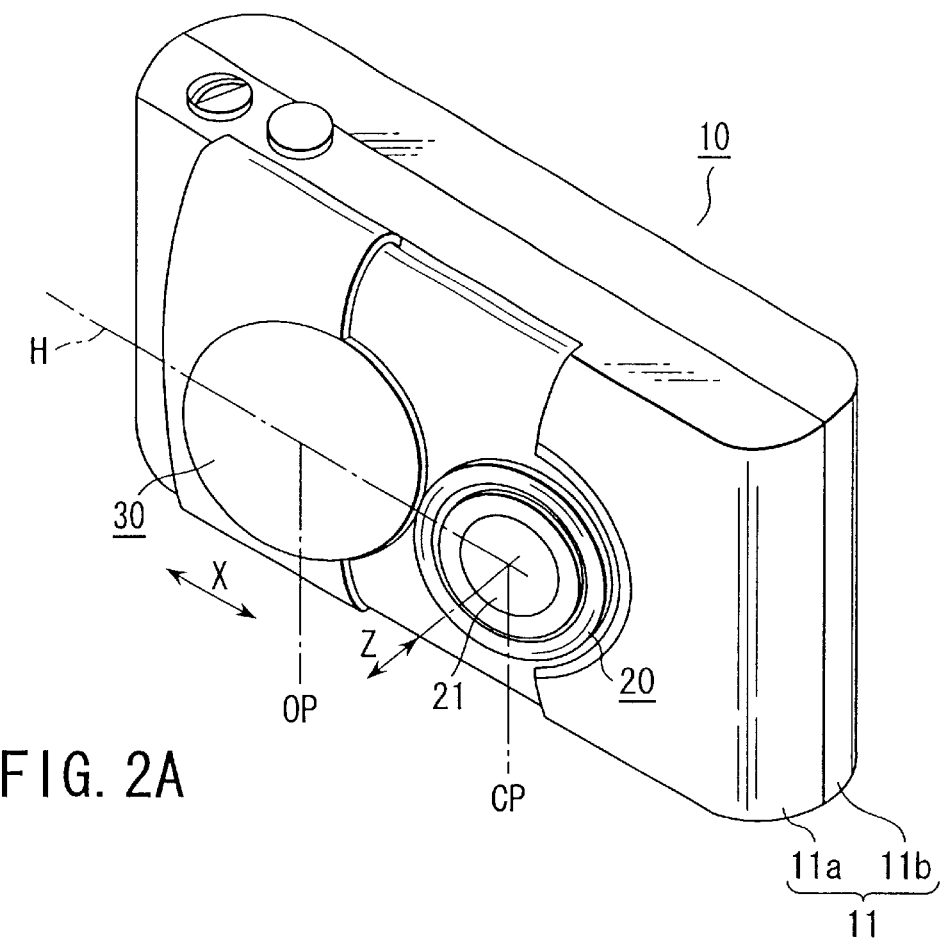
FIGS. 2A and 2B are views showing a camera according to a first embodiment of the present invention.
Figure 2B:
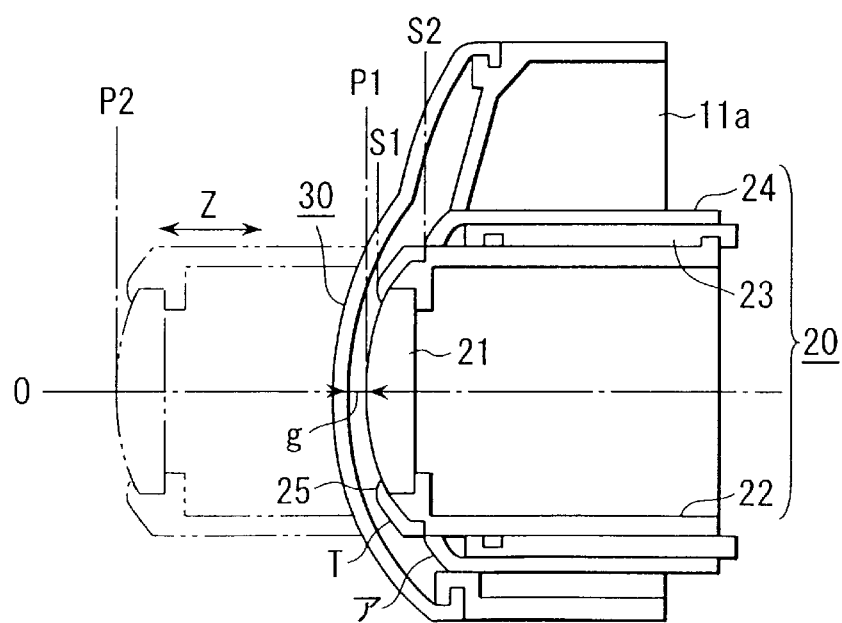

FIGS. 2A and 2B are views showing a camera according to a first embodiment of the present invention. FIG. 2A is a perspective view showing an external view, and FIG. 2B is a longitudinal section view of a main part. In FIGS. 2A and 2B, a camera main body 10 is covered by a cover member 11 comprising a front cover 11a and a rear cover 11b. A collapsible mount type photographic lens tube 20 comprising a photograph lens 21, and a lens barrier 30 is mounted to a front surface of the camera main body 10.

The collapsible mount type photographic lens tube 20 is provided with the photographic lens 21 so as to be able to advance and retreat along a photographic optical axis O between a collapsed position P1 and a photographing position P2. That is, the collapsible mount type photographic lens tube 20 is provided with a moving tube frame 22 holding the photographic lens at its top so as to be able to advance and retreat along the photographic optical axis O in the direction shown by an arrow Z accompanied with the rotation of a rotational frame (cum frame) 23 which is fitted to the inner side of a fixed frame (outer frame) 24. The photographic lens 21 is held on the tip of the moving tube frame 22 by a lens pressing member 25.

When the camera is not used, the collapsible mount type photographic lens tube 20 is pulled back to a collapsed position P1 at the back of the above described camera main body 10 as the photographic lens 21 shortens lens intervals, and is put into a housed state. When the camera is used, as the photographic lens 21 expands the lens intervals to predetermined intervals, the lens tube 20 advances to the front side of the camera main body 10 as shown by a two-dotted chain line and protrudes up to a photographing position P2 and is put into a state of being able to take a photograph.

The lens barrier 30 is movably attached to the front surface of the camera main body 10 in a direction orthogonal to the photographic optical axis O (direction shown by an arrow X parallel to a horizontal axis H in the first embodiment). Thus, when the camera is not used, the lens barrier 30 moves to a closed position C which covers the front surface of the photographic lens 21 so as to cover the front surface of the photographic lens 21 retreated to the collapsed position P1 and protects the photographic lens 21. When the camera is used, the lens barrier 30 moves to an open position OP shifted from the front surface of the photographic lens 21 so as not to prevent the movement of the above described photographic lens 21 which advances to the above described photographing position P2, and releases the front surface of the photographic lens 21 so that the camera is put into a state of being able to take a photograph.

The inner surface shape of the lens barrier 30 located in the closed position CP becomes a shape corresponding to the outer shape of the front side end portion of the photographic lens tube 20 at the time when the photographic lens 21 retreats to the collapsed position P1. The inner surface shape of the lens barrier 30 comprises a concave curved surface (concave cylindrical surface in the first embodiment) parallel to the moving direction of the barrier 30. The shape inside a plane which is at least orthogonal to the moving direction of the above described barrier 30 and which includes the above described photographic optical axis O has a convex curved surface as shown by FIG. 2B so that the barrier 30 becomes a shape corresponding to the outer surface shape of the front side end portion of the photographic barrel 20.

As shown in FIG. 2B, the outer surface shape of the front side end portion of the photographic barrel 20 retreats gradually step by step to the back of the camera main body 10 (the right direction in the drawing) as it moves away from the photographic optical axis O. Thus, so as to form a so-called head-mounted conical body, the end surfaces of the front sides of a plurality of barrel bodies (the moving tube frame 22 and the fixed frame 24 in the first embodiment) are positioned in a state of being shifted to S1, S2 . . . in the order, and each of the above described end surface becomes a tapered surface (inclined surface largely chamfered) T which is inclined gradually to the backside as it moves away from the photographic optical axis O.

In the camera of the first embodiment, the outer surface shape of the front side end portion of the photographic lens tube 20 substantially matches the inner surface shape of the lens barrier 30. For this reason, the inner surface central region of the lens barrier 30 can be arranged so as to be brought as closely as possible near to a position of an approachable limit (spaced distance g=1 mm or less) to the front side end portion of the photographic lens tube 20 along the photographic optical axis O. As a result, by the portion equivalent to the distance that could be approached, a total thickness dimension of the camera main body 10 and the lens barrier 30 can be made smaller than that in the conventional example. Accordingly, making the camera thinner can be attempted.

(Second Embodiment)

Figure 3A:
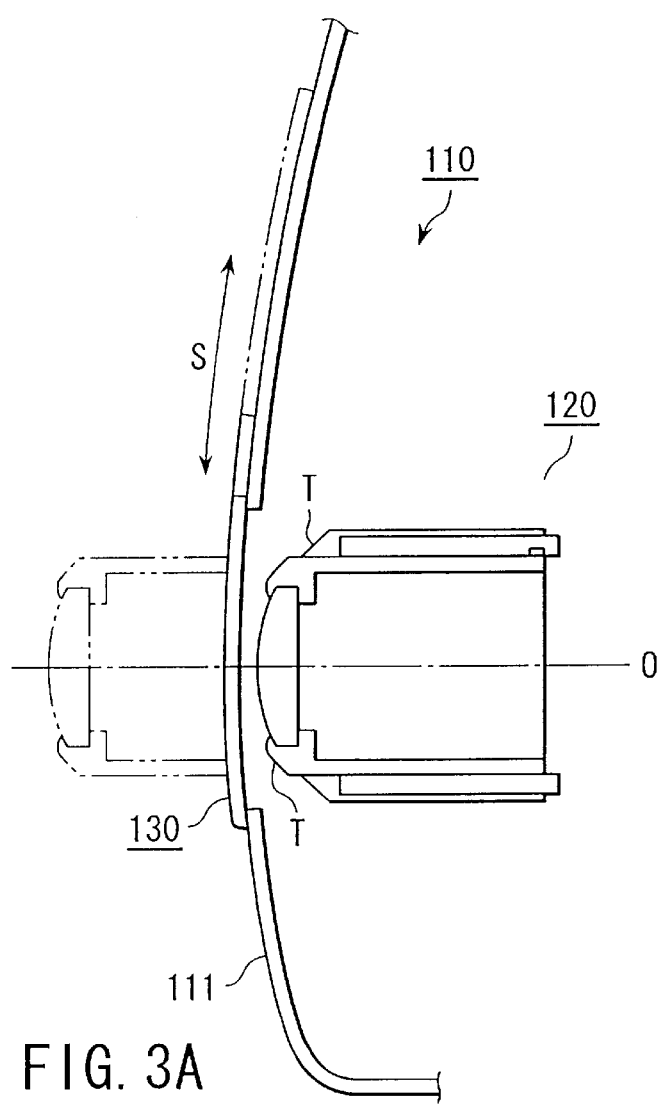
FIGS. 3A and 3B are views showing main parts of a camera according to a second embodiment of the present invention.
Figure 3B:
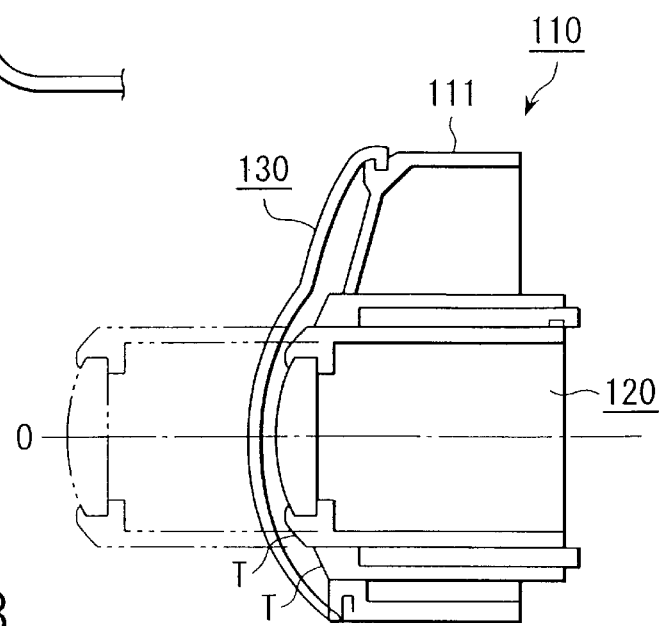

FIGS. 3A and 3B are views showing main parts of a camera according to a second embodiment of the present invention. FIG. 3A is a schematic sectional view seen from the upper side of the camera, and FIG. 3B is a schematic longitudinal sectional view seen from the side of the camera. The different points between the first embodiment and the second embodiment are three in that (1) the inner surface shape of the lens barrier is formed to be substantially spherical, (2) the lens barrier slides along the front surface of the camera main body, which is formed to be substantially spherical, so as to draw a circular arc and (3) the outer surface shape of the front side end portion of the photographic lens tube is formed to be a substantially spherical shape so as to fit to the inner surface shape of the above described lens barrier.

As shown in FIGS. 3A and 3B, a cover member 111 of a camera main body 110 is curved so as to be formed in a substantially spherical surface. A lens barrier 130 mounted on the front surface of the cover material 111 is curved as a whole so that the inner surface shape is formed to be substantially spherical. The lens barrier 130 can slide along the front surface of the above described cover material 111 as shown by an arrow S so as to draw a circular arc. The outer surface shape of the front side end portion of a photographic lens tube 120 is formed to be substantially spherical so as to match the inner surface shape of the above described lens barrier 130.

That is, the inner surface shape of the above described lens barrier 130 is formed in a shape corresponding to the outer surface shape of the front side end portion of the photographic lens tube 120, that is, the lens barrier 130 is formed so as to be a concave curved surface, even if it is in a shape inside a plane which includes the photographic optical axis O as shown in FIG. 3A and which is parallel to the moving direction of the lens barrier 130, or in a shape inside a plane which includes the photographic optical axis as shown in FIG. 3B and which is orthogonal to the moving direction of the lens barrier 130. Specifically, the front side end surfaces of a plurality of barrel bodies that constitute the photographic lens tube 120 are positioned by being shifted gradually to the backside similarly to the case of the first embodiment. Further, the front side end surfaces of a plurality of barrel bodies become tapered surfaces (inclined surfaces largely chamfered) T, which incline gradually to the back as they withdraw from the photographic optical axis O.

As shown in FIG. 3A, the shape of the barrier inside a horizontal plane parallel to the moving direction of the lens barrier 130 has a smaller curve degree in comparison to the shape of the barrier inside a vertical surface orthogonal to the moving direction of the lens barrier 130 shown in FIG. 3B. Accordingly, in correspondence with this, a shifted amount of the end surface position and an inclined degree of the tapered surface T of each barrel body may be adequately adjusted so that the outer surface shape of the front side end portion of the photographic lens tube 120 shown in FIG. 3A has a smaller curve degree than that of the outer surface of the front side end portion of the photographic lens tube 120 shown in FIG. 3B.

The points other than the above described are the same as the first embodiment and therefore the description thereof will be omitted.

(Third Embodiment)

Figure 4A:
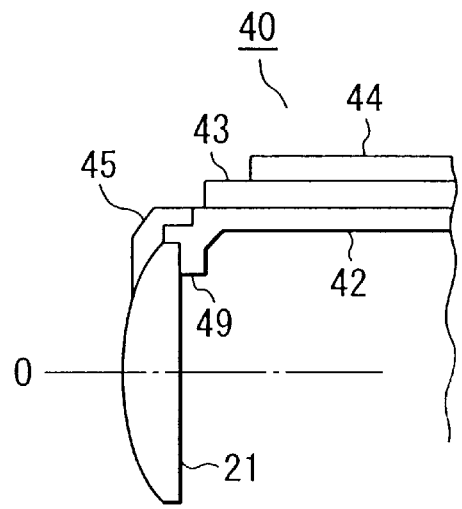
FIGS. 4A to 4C are views showing main parts of a camera according to a third embodiment of the present invention, and each of FIG. 4A to FIG. 4C is a schematic sectional view showing a different example of an attachment method of a photographic lens to a moving tube frame.
Figure 4B:
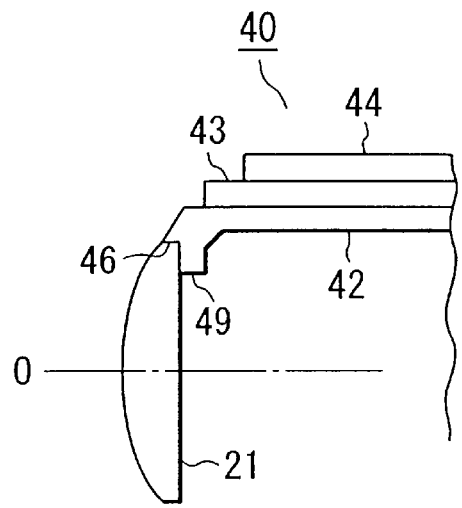
Figure 4C:
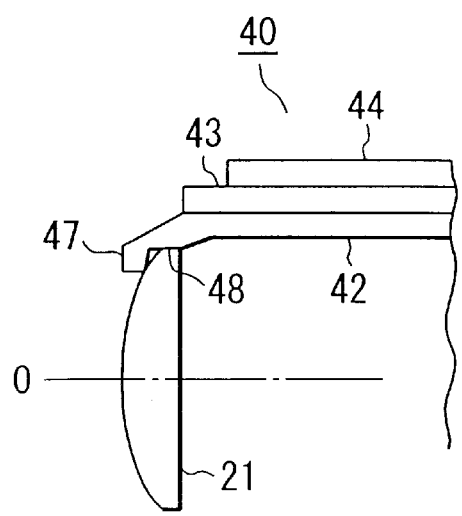

FIGS. 4A to 4C are views showing main parts of a camera according to a third embodiment of the present invention. FIGS. 4A to 4C are schematic sectional views showing different examples of an attachment method of a photographic lens to a moving tube frame, respectively. The third embodiment is an example of the present invention adapted to a camera, wherein a moving tube frame 42, a rotational frame (cam frame) 43 and a fixed frame (outer frame) 44, which are a plurality of barrel bodies to constitute the photographic lens tube, are coaxially arranged from a axial center to the outside in that order, comprising a photographic lens tube 40 of a type which moves away gradually to the backside (the right side in the drawing) of the camera main body 10 as each end portion of the front side of each frame moves away from the photographic optical axis O. Incidentally, in FIGS. 4A to 4C, the upper and the lower sides of the photographic optical axis O are symmetrical and therefore the lower side is omitted from being illustrated.

FIG. 4A is a view showing an example where the outer peripheral edge of the photographic lens 21 is pressed by a lens pressing member 45 similarly to the camera of the first embodiment. Incidentally, reference numeral 49 denotes a lens support portion for supporting the inner peripheral edge of a photographic lens inner surface.

FIG. 4B is a view showing an example of omitting the lens pressing member 45 shown in FIG. 4A and attaching and fixing the photographic lens 21 to a holding portion 46 of the moving tube frame 42.

FIG. 4C is a view showing an example, in which a lens pressing member 47 is integrally formed on the front end of the moving tube frame 42 and the above described support portion 49 is omitted and the photographic lens 21 is attached and fixed to a holding portion 48 of the moving tube frame 42.

Although a part of each end surface of the front side of each frame body shown in FIGS. 4A to 4C is taken as a vertical surface to the photographic optical axis, it may be taken as an inclined surface, respectively, similarly to the first embodiment.

(Characteristic Points in the Above Embodiments)

From the above described embodiments, the following inventions can be introduced.

A camera according to the first aspect is characterized by comprising: a lens tube having a plurality of tube frames of different inner diameters, said plurality of tube frames moving between a collapsed position where said plurality of tube frames are collapsed and housed and a photographing position protruded from a camera main body in the order of large diameter; and a lens barrier movable between a covered position to cover said lens tube housed in the collapsed position and an exposed position to expose said lens tube, in which in a state of said lens tube being housed in the collapsed position, a shape of an outer peripheral surface of a tip portion of a first tube frame positioned closest to an optical axis becomes larger in the diameter as it is closer to a photographer side along the optical axis, an a position of a tip portion of a second tube frame having a larger diameter than an outer diameter of said first tube frame is positioned at the photographer side rather than the maximum diameter portion of the outer peripheral surface of the tip portion of said first tube frame.

In the first aspect, it is preferable that a shape of the outer peripheral surface of the tip portion of said lens tube housed in the collapsed position is substantially conical as a whole.

Furthermore, it is preferable that a shape of the outer peripheral surface of the tip portion of said lens tube housed in the collapsed position is substantially conical as a whole, and a portion covering said lens tube of said lens barrier has a substantially uniform thickness, and an inner surface of a portion covering said lens tube is formed to be parallel to the substantially conical outer peripheral surface of the tip portion of said lens tube.

A camera according to the second aspect is characterized by comprising: a lens tube having a plurality of tube frames of different inner diameters, said plurality of tube frames collapsed in a collapsed position so that an outer peripheral surface of a tip portion shapes of said plurality of tube frames form substantially conical when it is not used, said plurality of tube frames protruded in the order of large diameter from a camera main body front surface when it is moved to a photographing position capable of taking a photograph; and a lens barrier movable between a covered position to cover said lens tube housed in the collapsed position and an exposed position to expose said lens tube, said lens barrier being positioned in a spatial portion formed by forming a tip outer peripheral surface of said lens tube substantially conical by a part of its inner surface when it slidably moves to the covered position to cover said lens tube, in which an inner peripheral surface of said lens barrier corresponding to said spatial portion is brought in a vicinity of the camera main body.

In the second aspect, it is preferable that each of said plurality of tube frames of different inner diameters has an inclined surface portion whose diameters become larger as they approach toward a photographer side along the optical axis, and a parallel surface portion parallel to an optical axis.

Furthermore, it is preferable that, in the collapsed position, a substantially conical portion formed in said lens tube tip portion is formed by an inclined surface portion formed in a first tube frame positioned closest to the optical axis and a parallel surface portion parallel to the optical axis formed in a second tube frame having a larger inner diameter than an outer diameter of said first tube frame, where said inclined surface portion becomes larger in the diameter as it approaches to the photographer side along the optical axis. With this configuration it is preferable that a tip portion of said second tube frame is positioned at the photographer side rather than the maximum diameter portion of the inclined surface portion formed in the outer peripheral surface of a tip portion of said first tube frame.

A camera according to the third aspect is characterized by comprising: a camera main body; a photographic lens tube mounted on a front surface of said camera main body and having a photographic lens provided to be able to advance and retreat along a photographic optical axis between a collapsed position retreated to the backside of said camera main body and a photographing position advanced to a front side of said camera main body; and a lens barrier mounted on a front surface of said camera main body and provided to be movable in a direction to substantially vertically cross said photographic optical axis between a closed position for closing the front surface of said photographic lens to cover said photographic lens retreated to said collapsed position when it is not used and an open position to open the front surface of said photographic lens so as not to prevent the movement of said photographic lens advancing to said photographing position when it is used, in which an inner surface of said lens barrier is formed to be parallel to an outer surface shape of the front side end portion of said photographic lens tube at the time when said photographic lens retreats to said collapsed position.

In the third aspect, it is preferable that the inner surface shape of said lens barrier comprises a concave curved surface parallel to the moving direction of the barrier, and the outer surface shape of the front side end portion of said photographic lens tube is at least orthogonal to the moving direction of said barrier, and said inner surface shape of the barrier is adaptable to a shape inside a plane including said photographic optical axis of the outer surface of the lens tube which has a convex curved surface.

Furthermore, it is preferable that the outer surface shape of the front side end portion of said photographic lens tube at the time when said photographic lens retreats to said collapsed position retreats gradually to the back of said camera main body as it moves away from said photographic optical axis, and end surfaces of the front sides of a plurality of tubes constituting the photographic lens tube are positioned to form a head mounted conical body. With this configuration, it is preferable that the end surfaces of the front sides of said plurality of barrels have tapered surfaces retreating gradually to the backside as they are away from said photographic optical axis.

In the present embodiments, the inner surface shape of the lens barrier 30 matches the outer shape of the front side end portion of the photographic lens tube 20. Accordingly, the inner surface central region of the lens barrier 30 can be arranged so as to be brought as closely as possible near to a position of an approachable limit (spaced distance g) to the front side end portion of the photographic lens tube 20 along the photographic optical axis O. As a result, by the portion equivalent to the distance that could be approached, a total thickness dimension of the camera main body 10 and the lens barrier 30 can be made smaller, and thinning the camera can be achieved.

Further, in the present embodiments, it is of course possible to bring the lens barrier 30 near to the front side end portion of the photographic lens tube 20, and also possible to equalize a thickness of the lens barrier 30 which forms a convex curved surface in the outer surface shape in the usual case. Therefore, so-called shaping processing distortion can be reduced. Furthermore, since the outer surface shape of the lens barrier 30 forms a convex curved surface, a mechanical strength of the lens barrier 30 itself against an external force is not reduced and a portability of the camera is not harmed as well.

In addition, if special curving processing is not applied to the front side end portion of the photographing lens tube 20, the shape of the front end side portion can be in a substantially convex curved surface.

Moreover, the shape of the front side end portion of the photographic lens tube 20 becomes a smooth curved surface having little or no unevenness. For this reason, the outer surface shape of the front side end portion of the photographic lens tube 20 can be approximated more to the inner surface shape of the lens barrier 30.

As described above, in the embodiments of the present invention, the inner surface shape of the lens barrier positioned at the closed position is formed in a shape corresponding to the outer surface shape of the front side end portion of the photographic lens tube at the time when the photographic lens retreats to the collapsed position. Hence, according to the embodiments, the lens barrier can be arranged so as to be brought as closely as possible near to a position of an approachable limit to the front side end portion of the photographic lens tube along the photographic optical axis. As a result, by the portion equivalent to the distance that could be approached, a total thickness of the camera body and the lens barrier can be made smaller, and thinning the camera can be achieved.

What is claimed is:

1. A camera comprising:
  a lens barrel having a plurality of tube frames each having different inner diameters, said plurality of tube frames moving between a collapsed position and a photographing position, wherein said plurality of tube frames are collapsed and housed in the collapsed position, and said plurality of tube frames protrude from a front side a camera main body in decreasing order of diameter; and
  a lens barrier which is located at the front side of the camera main body and is moveable between a covered position to cover said leans barrel housed in the collapsed position and an exposed position to expose said lens barrel, wherein
    in a state that said lens barrel is housed in the collapsed position,
    said plurality of tube frames includes at least a first tube frame having a smallest inner diameter and a second tube frame whose inner diameter is larger than an outer diameter of the first tube frame,
    a diameter of a tip portion of the first tube frame becomes larger toward a rear side of the camera main body and the outer diameter except the tip portion thereof is substantially constant, and
    a tip portion of the second tube frame is positioned at a position closer to the rear side of the camera main body than the tip portion of said first tube frame.

2. The camera according to claim 1, wherein the outer surface of the tip portion of said lens barrel housed in the collapsed position has a substantially conical shape as a whole.

3. The camera according to claim 1, wherein
  the outer surface of the tip portion of said lens barrel housed in the collapsed position has a substantially conical shape as a whole, and
  a portion of said lens barrier covering said lens barrel has a substantially uniform thickness, and an inner surface of said lens barrier covering said lens barrel is formed to be parallel to the outer surface of the tip portion of said lens barrel.

4. A camera comprising:

a lens barrel having a plurality of tube frames each having different inner diameters, said plurality of tube frames collapsed in a collapsed position to form an outer surface of tip portions of said plurality of tube frames in a substantially conical shape when the photographing is not performed, said plurality of tube frames protruding in decreasing order of diameter from a front surface of a camera main body when the lens barrel is moved to a photographing position capable of taking a photograph; and a lens barrier which is movable between a covered position to cover said lens barrel housed in the collapsed position and an exposed position to expose said lens barrel, an inner surface of said lens barrier being positioned at a spatial portion formed by forming a tip outer surface of said lens barrel substantially a conical shape when the lens barrier slidably moves to the covered position to cover said lens barrel, wherein an inner surface of said lens barrier corresponding to said spatial portion is brought in a vicinity of the camera main body.

5. The camera according to claim 4, wherein each of said plurality of tube frames has an inclined surface portion whose diameter becomes larger toward a photographer side, and a parallel surface portion which is parallel to an optical axis.

6. The camera according to claim 4, wherein, in the collapsed position, said lens barrel is formed with an inclined surface portion formed at a first tube frame positioned closest to the optical axis and a parallel surface portion parallel to the optical axis formed at a second tube frame having a larger inner diameter than an outer diameter of said first tube frame, and said inclined surface portion becomes larger in the diameter toward the photographer side along the optical axis.

7. The camera according to claim 6, wherein a tip portion of said second tube frame is positioned closer to the photographer side than the inclined surface portion formed on the outer surface of a tip portion of said first tube frame.

8. A camera comprising:

a camera main body:

a photographic lens barrel mounted on a front of said camera main body and having a photographic lens provided to be able to advance and retreat along a photographic optical axis between a collapsed position retreated to the rear side of said camera main body and a photographing position advanced to a front side of said camera main body; and a lens barrier mounted on a front surface of said camera main body and provided to be movable in a direction to substantially vertically cross said photographic optical axis between a closed position for closing the front surface of said photographic lens to cover said photographic lens retreated to said collapsed position when the photographing is not performed and an open position to open the front surface of said photographic lens so as not to prevent the movement of said photographic lens advancing to said photographing position when the photographing is performed, wherein the inner surface of said lens barrier has a concave surface parallel to a moving direction of the barrier, and the outer surface of an end portion of a front side of said photographic lens barrel is orthogonal to at least said moving direction of said barrier, and said inner surface of the barrier is formed according to a shape of the outer surface of the lens barrel which has a convex surface.

9. The camera according to claim 8, wherein the photographic lens barrel has a plurality of lens barrels and end surfaces of the front sides of the plurality of lens barrels are positioned such that the plurality of lens barrels are retreated one by one toward a rear side of said camera main body along said photographic optical axis and the outer surface of the front side end portion of said photographic lens barrel has a conical shape at the time when said photographic lens is retreated to said collapsed position.

10. A camera comprising:

a camera main body;

a photographic lens barrel mounted on a front of said camera main body and having a photographic lens provided to be able to advance and retreat along a photographic optical axis between a collapsed position retreated to the rear side of said camera main body and a photographing position advanced to a front side of said camera main body; and a lens barrier mounted on a front surface of said camera main body and provided to be movable in a direction to substantially vertically cross said photographic optical axis between a closed position for closing the front surface of said photographic lens to cover said photographic lens retreated to said collapsed position when the photographing is not performed and an open position to open the front surface of said photographic lens so as not to prevent the movement of said photographic lens advancing to said photographing position when the photographing is performed, wherein an inner surface of said lens barrier is formed to be parallel to an outer surface of the front portion of said photographic lens barrel at the time when said photographic lens retreats to said collapsed position, and the end surfaces of the front sides of said plurality of lens barrels have tapered surfaces which is inclined such that a diameter thereof becomes larger toward the rear side along said photographic optical axis.

11. A camera comprising:

a first lens barrel frame having a tip portion which is protruded from a front side of a camera main body when the first lens barrel frame is collapsed at a collapsed position or at a time of use of the camera when the photographing can be performed, an outer surface of a tip portion of the first lens barrel frame having a conical surface whose diameter becomes larger apart from an optical axis a second tube lens frame having a larger inner diameter than an outer diameter of said first lens barrel frame and positioned closer to the front side of the camera main body than the tip portion of said first tube lens frame when a tip portion of the second lens barrel frame is collapsed at a collapsed position or at a time of use of the camera when the photographing can be performed: and a lens barrier which is movable to a position covering the front of the camera main body when a lens barrel including said first and second tube lens frames is housed at a collapsed position and is movable to a position to expose said lens barrel when said lens barrel including said first and second tube lens frames can be used.

12. The camera according to claim 11, wherein an inner surface of said lens barrier is formed in a concave shape to match a convex shape of the tip portion of said second tube frame.

13. The camera according to claim 11, wherein a tip portion of said second tube frame is formed to be a conical shape in which an outer diameter of the tip portion of said second tube frame becomes large according to a distance from an optical axis, and an inner surface of said lens barrier is formed in a concave shape to match a convex shape of the tip portion of said second tube frame.

14. The camera according to claim 11, wherein a tip portion of the lens barrel including said first and second tube frame has a spherical shape as a whole.

15. A camera comprising:

a camera main body;

a photographic lens barrel having a photographic lens which is mounted on a front side of the camera main body and provided so as to be able to advance and retreat between a collapsed position retreated to the rear side of the camera main body and a photographing position advanced to the front side of the camera main body; and a lens barrier mounted on the front surface of said camera main body and provided so as to be movable along a direction to substantially vertically cross said photographic optical axis between a closed position for closing the front surface of said photographic lens so as to cover said photographic lens retreated to said collapsed position when the lens barrel is not used and an open position for opening the front surface of said photographic lens so as not to prevent the movement of said photographic lens advancing to said photographing position when the lens barrel is used, wherein the outer surface of the tip portion of the photographic lens barrel at the time when the photographic lens retreats to the collapsed position is formed in a shape corresponding to a shape of an inner surface of the lens barrier located at the closed position.

16. A camera comprising:

a lens barrel having a plurality of tube frames each having different inner diameters, said plurality of tube frames moving between a collapsed position and a photographing position, wherein said plurality of tube frames are collapsed and housed in the collapsed position, and said plurality of tube frames protrude from a front side a camera main body in decreasing order of diameter; and a lens barrier which is located at the front side of the camera main body and is moveable between a covered position to cover said leans barrel housed in the collapsed position and an exposed position to expose said lens barrel, wherein in a state that said lens barrel is housed in the collapsed position, said plurality of tube frames includes at least a first tube frame having a smallest inner diameter and a second tube frame whose inner diameter is larger than an outer diameter of the first tube frame, a diameter of a tip portion of the first tube frame becomes larger toward a rear side of the camera main body and the outer diameter except the tip portion thereof is substantially constant, and a tip portion of the second tube frame is positioned at a position closer to the rear side of the camera main body than the tip portion of said first tube frame, wherein the outer surface of the tip portion of said lens barrel housed in the collapsed position has a substantially conical shape as a whole.

17. The camera according to claim 16, wherein the outer surface of the tip portion of said lens barrel housed in the collapsed position has a substantially conical shape as a whole, and a portion of said lens barrier covering said lens barrel has a substantially uniform thickness, and an inner surface of said lens barrier covering said lens barrel is formed to be parallel to the outer surface of the tip portion of said lens barrel.

* * * * *

UNITED STATES PATENT AND TRADEMARK OFFICE
CERTIFICATE OF CORRECTION

PATENT NO. : 6,595,702 B2
DATED : July 22, 2003
INVENTOR(S) : Tatsuya Suzuki

It is certified that error appears in the above-identified patent and that said Letters Patent is hereby corrected as shown below:

Column 1,
Line 38, after the phrase "lens 61", delete "retreat" and insert therefor -- retreats --.

Column 8,
Line 37, after the word "side", insert -- of --.
Line 41, after the word "said", delete "leans" and insert therefor -- lens --.

Column 12,
Line 4, after the word "side", insert -- of --.
Line 8, after the word "said", delete "leans" and insert therefor -- lens --.

Signed and Sealed this

Fifteenth Day of June, 2004

JON W. DUDAS
*Acting Director of the United States Patent and Trademark Office*